United States Patent
Hou et al.

(10) Patent No.: US 12,316,431 B2
(45) Date of Patent: May 27, 2025

(54) SATELLITE BEAM OFFSET PROCESSING METHOD, DEVICE AND MEDIUM

(71) Applicant: DATANG MOBILE COMMUNICATIONS EQUIPMENT CO., LTD., Beijing (CN)

(72) Inventors: Liming Hou, Beijing (CN); Shaoli Kang, Beijing (CN); Deshan Miao, Beijing (CN); Shaohui Sun, Beijing (CN); Yingmin Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 374 days.

(21) Appl. No.: 17/783,643

(22) PCT Filed: Dec. 9, 2020

(86) PCT No.: PCT/CN2020/134808
§ 371 (c)(1),
(2) Date: Jun. 9, 2022

(87) PCT Pub. No.: WO2021/135869
PCT Pub. Date: Jul. 8, 2021

(65) Prior Publication Data
US 2023/0006732 A1   Jan. 5, 2023

(30) Foreign Application Priority Data
Dec. 31, 2019  (CN) .......................... 201911419632.0

(51) Int. Cl.
| | |
|---|---|
| *H04B 7/185* | (2006.01) |
| *H04W 16/28* | (2009.01) |
| *H04W 48/20* | (2009.01) |

(52) U.S. Cl.
CPC ........ *H04B 7/18513* (2013.01); *H04W 16/28* (2013.01); *H04W 48/20* (2013.01)

(58) Field of Classification Search
CPC ... H04B 7/18513; H04W 16/28; H04W 48/20
See application file for complete search history.

(56) References Cited

U.S. PATENT DOCUMENTS

| 2010/0244049 A1 | 9/2010 | Yamamoto et al. |
| 2011/0204383 A1 | 8/2011 | Yamamoto et al. |
| (Continued) | | |

FOREIGN PATENT DOCUMENTS

| JP | 2000101100 A | 4/2000 |
| JP | 2008072146 A | 3/2008 |
| (Continued) | | |

OTHER PUBLICATIONS

International Search Report (ISR) dated Oct. 19, 2021 for International Application No. PCT/JP2021/031066.

(Continued)

*Primary Examiner* — Elton Williams
(74) *Attorney, Agent, or Firm* — Ladas & Parry, LLP

(57) ABSTRACT

This disclosure provides a satellite beam offset processing method, a device and a medium. The method includes: a network side device indicating a satellite beam offset parameter to a terminal via a broadcast message and/or a dedicated signalling; the terminal receiving the satellite beam offset parameter indicated by the network side device via the broadcast message and/or the dedicated signalling; and the terminal adjusting a communication process of the terminal according to the satellite beam offset parameter.

16 Claims, 3 Drawing Sheets

(56) References Cited

U.S. PATENT DOCUMENTS

| | | |
|---|---|---|
| 2014/0061670 A1 | 3/2014 | Wada et al. |
| 2015/0270353 A1 | 9/2015 | Shimizu et al. |
| 2016/0225891 A1 | 8/2016 | Hiyoshi et al. |
| 2022/0368401 A1* | 11/2022 | Yang .................. H04B 7/18541 |

FOREIGN PATENT DOCUMENTS

| | | |
|---|---|---|
| JP | 2010225877 A | 10/2010 |
| JP | 2011176015 A | 9/2011 |
| JP | 2014053393 A | 3/2014 |
| JP | 2015056543 A | 3/2015 |
| JP | 2015185617 A | 10/2015 |

OTHER PUBLICATIONS

Written Opinion of the International Searching Authority in International Application No. PCT/JP21/031066 dated Oct. 19, 2021 with English translation provided by Google Translate.
"Schottky Barrier Height Modulation of the Metal/4H—SiC Contact by Ultra-Thin Dielectric Insertion Technique," Bing-Yue Tsui et al., Extended Abstracts of the 2013 International Conference on Solid State Devices and Materials, Fukuoka, 2013, pp. 468-469.
Extended European Search Report for corresponding European Patent Application No. 20908854.1 issued on Jan. 19, 2023.
"Broadband LEO Satellite Communications: Architectures and Key Technologies," Yongtao Su, Yaoqi Liu, Yiqing Zhou, Jinhong Yuan, Huan Cao, IEEE Wireless Communications, Coordinated Science Laboratory; Dept. Electrical and Computer Engineering; University of Illinois at Urbana-Champaign, US, vol. 26, No. 2, Apr. 1, 2019 (Apr. 1, 2019), all pages.

\* cited by examiner

SATELLITE BEAM OFFSET PROCESSING METHOD, DEVICE AND MEDIUM

CROSS-REFERENCE TO RELATED APPLICATIONS

The present application is a U.S. national phase application of a PCT Application No. PCT/CN2020/134808 filed on Dec. 9, 2020, which claims a priority to the Chinese patent application No. 201911419632.0 filed in China on Dec. 31, 2019, the disclosures of which are incorporated herein by reference in their entireties.

TECHNICAL FIELD

The present disclosure relates to the field of wireless communication technologies, and in particular, to a satellite beam offset processing method, a device, and a medium.

BACKGROUND

FIG. 1 is a schematic diagram of coverage of a satellite in a normal mode. As shown in the figure, in the normal coverage mode of a low earth orbit (LEO) satellite, the satellite beam is not offset and covers the ground area vertically.

In the normal coverage mode, the ground coverage of the satellite is basically fixed, and the satellite beam angle width is basically fixed.

FIG. 2 is a schematic diagram of coverage of a satellite in the case that the satellite beam is offset. As shown in the figure, when the satellite covers the equatorial region, in order to avoid signal interference to the geostationary earth orbit (GEO) satellite, the LEO satellite offsets its beam, and there is an offset angle $\alpha$ between a central axis of the beam and a vertical axis with respect to the centre of the earth.

The disadvantage of the related art is that the satellite communication system cannot guarantee the normal operation of the terminal in the beam offset region.

SUMMARY

The present disclosure provides a satellite beam offset processing method, a device and a medium, to solve the problem that the satellite communication system in the related art cannot guarantee the normal operation of the terminal in the beam offset region.

An embodiment of the present disclosure provides a satellite beam offset processing method, including:
  a network side device determining a satellite beam offset parameter;
  the network side device indicating the satellite beam offset parameter to a terminal via a broadcast message and/or a dedicated signalling.

In an implementation, the broadcast message is a system information block (SIB); and/or the dedicated signalling includes one of the following information or a combination of the following information: radio resource control (RRC) information, downlink control indicator (DCI) indication information or medium access control control element (MAC CE) indication information.

In an implementation, the network side device indicating the satellite beam offset parameter to the terminal via the broadcast message and/or the dedicated signalling includes:
  the network side device indicating to following terminals via the broadcast message: a terminal during initial access, a terminal in an idle state, or a terminal during cell reselection; and/or,
  the network side device indicating to following terminals via the dedicated signalling: a terminal to be handed over to a target cell, or a terminal to be handed over to a target satellite.

In an implementation, the satellite beam offset parameter includes a beam offset angle $\alpha$ of a satellite, the beam offset angle $\alpha$ being an angle between a central axis of a beam of the satellite and a line connecting a centre of mass of the satellite to a centre of the earth.

In an implementation, the network side device indicates the beam offset angle $\alpha$ to the terminal with information less than or equal to 8 bits in the broadcast message and/or the dedicated signalling.

An embodiment of the present disclosure provides a satellite beam offset processing method, including:
  a terminal receiving a satellite beam offset parameter indicated by a network side device via a broadcast message and/or a dedicated signalling;
  the terminal adjusting a communication process of the terminal according to the satellite beam offset parameter.

In an implementation, the broadcast message is an SIB; and/or the dedicated signalling includes one of the following information or a combination of the following information: RRC information, DCI indication information or MAC CE indication information.

In an implementation, the terminal receives the satellite beam offset parameter indicated by the network side device via the broadcast message and/or the dedicated signalling in one of following ways or a combination of the following ways:
  receiving the indicated parameter via the broadcast message during initial access;
  receiving the indicated parameter via the broadcast message in an idle state;
  receiving the indicated parameter via the broadcast message in the idle state;
  receiving the indicated parameter via the broadcast message during cell reselection;
  receiving the indicated parameter via the dedicated signalling while waiting for a handover to a target cell;
  receiving the indicated parameter via the dedicated signalling while waiting for a handover to a target satellite.

In an implementation, the satellite beam offset parameter includes a beam offset angle $\alpha$ of a satellite, the beam offset angle $\alpha$ being an angle between a central axis of a beam of the satellite and a line connecting a centre of mass of the satellite to a centre of the earth.

In an implementation, the indicated parameter received by the terminal includes information of the beam offset angle $\alpha$ which is less than or equal to 8 bits.

An embodiment of the present disclosure provides a network side device, including:
  a processor, configured to read a program in a memory to perform following process:
  determining a satellite beam offset parameter;
  indicating the satellite beam offset parameter to a terminal via a broadcast message and/or a dedicated signalling;
  a transceiver, configured to receive and transmit data under control of the processor.

In an implementation, the broadcast message is an SIB; and/or the dedicated signalling includes one of the following information or a combination of the following information: RRC information, DCI indication information or MAC CE indication information.

In an implementation, the network device indicating the satellite beam offset parameter to the terminal via the broadcast message and/or the dedicated signalling includes:

indicating to following terminals via the broadcast message: a terminal during initial access, a terminal in an idle state, or a terminal during cell reselection; and/or, indicating to following terminals via the dedicated signalling: a terminal to be handed over to a target cell, or a terminal to be handed over to a target satellite.

In an implementation, the satellite beam offset parameter includes a beam offset angle α of a satellite, the beam offset angle α being an angle between a central axis of a beam of the satellite and a line connecting a centre of mass of the satellite to a centre of the earth.

In an implementation, the device indicates the beam offset angle α to the terminal with information less than or equal to 8 bits in the broadcast message and/or the dedicated signalling.

An embodiment of the present disclosure provides a satellite beam offset processing apparatus, including:

a determination module, configured to determine a satellite beam offset parameter;

an indication module, configured to indicate the satellite beam offset parameter to a terminal via a broadcast message and/or a dedicated signalling.

An embodiment of the present disclosure provides a terminal, including:

a processor, configured to read a program in a memory to perform following process:

receiving a satellite beam offset parameter indicated by a network side device via a broadcast message and/or a dedicated signalling;

adjusting a communication process of the terminal according to the satellite beam offset parameter;

a transceiver, configured to receive and transmit data under control of the processor.

In an implementation, the broadcast message is an SIB; and/or the dedicated signalling includes one of the following information or a combination of the following information: RRC information, DCI indication information or MAC CE indication information.

In an implementation, the terminal receives the satellite beam offset parameter indicated by the network side device via the broadcast message and/or the dedicated signalling in one of following ways or a combination of the following ways:

receiving the indicated parameter via the broadcast message during initial access;

receiving the indicated parameter via the broadcast message in an idle state;

receiving the indicated parameter via the broadcast message in the idle state;

receiving the indicated parameter via the broadcast message during cell reselection;

receiving the indicated parameter via the dedicated signalling while waiting for a handover to a target cell;

receiving the indicated parameter via the dedicated signalling while waiting for a handover to a target satellite.

In an implementation, the satellite beam offset parameter includes a beam offset angle α of a satellite, the beam offset angle α being an angle between a central axis of a beam of the satellite and a line connecting a centre of mass of the satellite to a centre of the earth.

In an implementation, the indicated parameter received by the terminal includes information of the beam offset angle α which is less than or equal to 8 bits.

An embodiment of the present disclosure provides a satellite beam offset processing apparatus, including:

a receiving module, configured to receive a satellite beam offset parameter indicated by a network side device via a broadcast message and/or a dedicated signalling;

a communication module, configured to adjust a communication process of a terminal according to the satellite beam offset parameter.

An embodiment of the present disclosure provides a computer-readable storage medium, wherein the computer-readable storage medium stores a computer program, and the computer program is configured to be executed by a processor to implement the above-mentioned satellite beam offset processing methods.

The beneficial effects of the present disclosure are as follows:

in the technical solutions provided by the embodiments of the present disclosure, after determining the satellite beam offset parameter, the network side device will indicate the satellite beam offset parameter to the terminal via a broadcast message and/or a dedicated signalling. After the terminal receives the satellite beam offset parameter, the terminal can adjust the communication process of the terminal according to the satellite beam offset parameter. Therefore, even if the LEO satellite adjusts the antenna beam direction in a specific region, the terminal can adjust the communication process of the terminal according to the satellite beam offset parameter, so that the terminal in the beam offset region can continue to operate normally, which is helpful for the normal operation of the system in the case that the beam is offset.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an undue limitation on the present disclosure. The accompanying drawings include the following.

DETAILED DESCRIPTION

Figure 1:
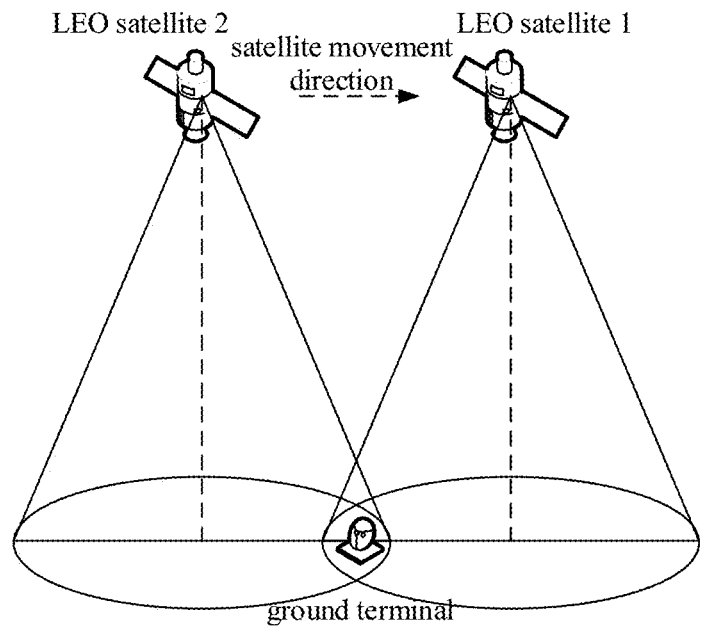
FIG. 1 is a schematic diagram of coverage of a satellite in a normal mode according to an embodiment of the present disclosure.
Figure 2:
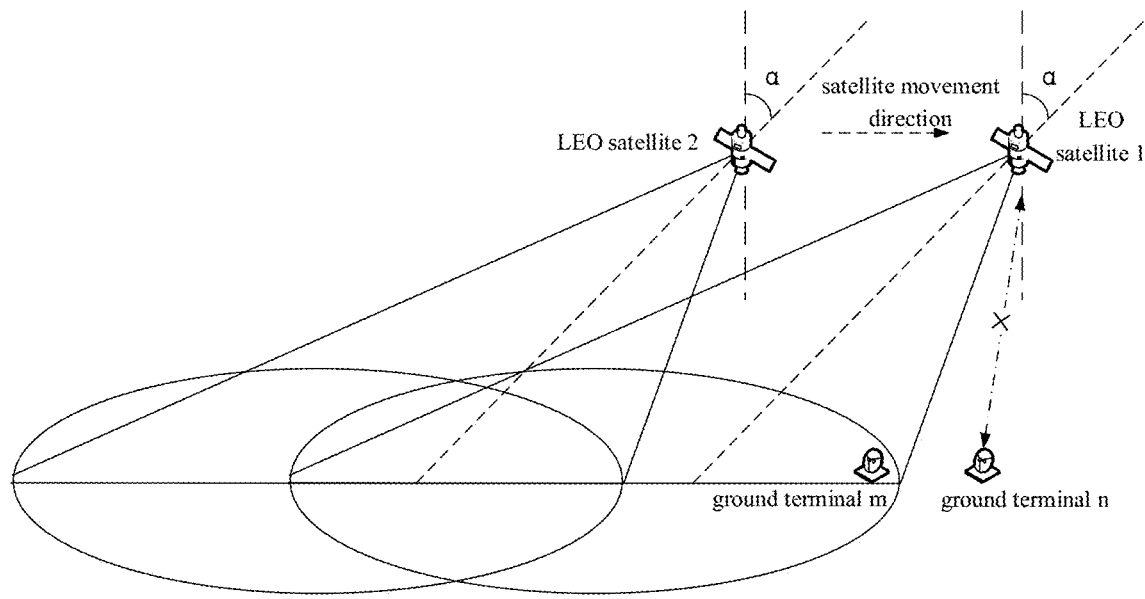
FIG. 2 is a schematic diagram of coverage of a satellite in the case that the satellite beam is offset according to an embodiment of the present disclosure.

During research, the inventor noticed the following.

In order to provide broadband data access services, LEO satellite broadband communication systems operate in high frequency bands such as Ku/Ka, which overlap in operating frequency with deployed GEO satellites, and tend to cause interference to GEO satellite signals in the equatorial region.

In order to avoid the interference to GEO satellites caused by the uplink signals of LEO satellite terminals, the LEO satellites near the equatorial region generally use a beam tilt technology to adjust the antenna coverage area of the satellites. The ground terminal in the equatorial region will adjust the antenna direction to adapt to the beam adjustment of the satellites, so as to prevent the uplink signal from falling into the reception range of GEO satellites as much as possible, thereby achieving the purpose of interference avoidance and elimination.

In the normal beam coverage mode of LEO satellites, the satellite beam is perpendicular to the ground and the beam angle is fixed. The satellite coverage is determined by system design, and there is no need to additionally indicate the satellite beam angle and other information to the terminals in the system.

However, in the beam offset mode, even though the position of the ground terminal relative to the satellite does not change, the beam coverage area of the satellite changes. The position of the terminal relative to the satellite alone is not sufficient to calculate the satellite coverage area, which affects the normal operation of the terminal.

For example, because LEO satellites adjust the antenna beam direction in a specific region, it will alter the way terminals operate in that region. For example, this will have an impact on the inter-satellite handover of the terminal. If the terminal does not know the beam offset status of the satellite and performs the handover according to the original method, the terminal will not find the corresponding satellite in the target position of the handover, resulting in handover failure and link interruption. Therefore, there is a need to solve the problem of how to operate the terminal in the case that the satellite beam is offset.

It can be seen that the satellite communication system in the related art does not consider how to indicate the satellite beam offset information and cannot guarantee the normal operation of the terminal in the beam offset region. In view of this, embodiments of the present disclosure provide a technical analysis of the LEO satellite beam offset problem, and propose a solution for indicating satellite beam offset information by using a broadcast message. The specific implementations of the present disclosure will be described below with reference to the accompanying drawings.

The solution provided in the embodiments of the present disclosure is an offset information indication solution in a one-dimensional satellite beam offset mode, that is, the beam offset of the satellite beam in the plane defined jointly by the satellite movement direction and a line connecting the satellite and the centre of the earth. However, those skilled in the art can easily understand that in the case of two-dimensional offset or three-dimensional offset, the indication solution of the beam offset angle only needs to be consistent with the solution provided in the embodiments of the present disclosure, and the difference only lies in that the beam offset angle parameters in other dimensions are added.

The implementations on the terminal side and the network side will be described respectively, and then an example of their coordinated implementation will be given to better understand the implementation of the solution given in the embodiments of the present disclosure. The manner of description does not mean that the two must be implemented in conjunction or separately. In fact, when the terminal and the network side device are implemented separately, they also solve the problems on the terminal side and the network side respectively, and when the two are used in combination, better technical results are obtained.

Figure 3:
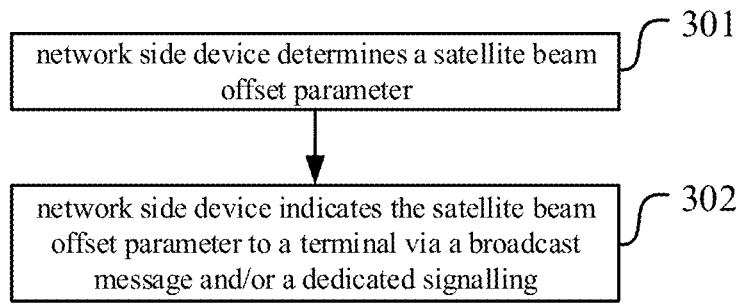
FIG. 3 is a schematic flowchart of a satellite beam offset processing method on the network side according to an embodiment of the present disclosure.

FIG. 3 is a schematic flowchart of the satellite beam offset processing method on the network side. As shown in the figure, the method includes:
step 301, a network side device determines a satellite beam offset parameter;
step 302, the network side indicates the satellite beam offset parameter to a terminal via a broadcast message and/or a dedicated signalling.

Figure 4:
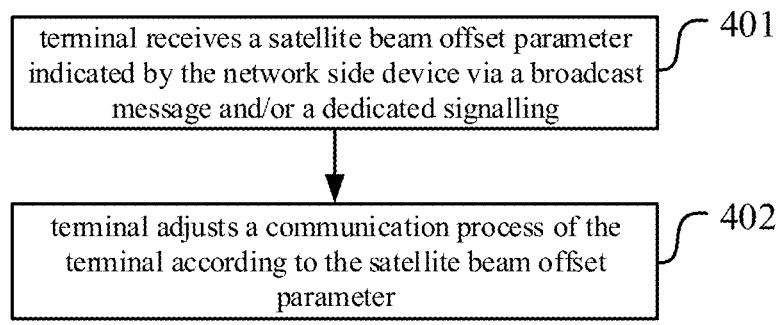
FIG. 4 is a schematic flowchart of a satellite beam offset processing method on the terminal side according to an embodiment of the present disclosure.

FIG. 4 is a schematic flowchart of the satellite beam offset processing method on the terminal side. As shown in the figure, the method includes:
step 401, the terminal receives the satellite beam offset parameter indicated by the network side device via a broadcast message and/or a dedicated signalling;
step 402, the terminal adjusts the communication process of the terminal according to the satellite beam offset parameter.

In an implementation, the broadcast message is an SIB; and/or the dedicated signalling includes one of the following information or a combination of the following information: RRC information, DCI indication information or MAC CE indication information.

In an implementation, the satellite beam offset parameter includes a beam offset angle $\alpha$ of a satellite, the beam offset angle $\alpha$ being an angle between a central axis of a beam of the satellite and a line connecting a centre of mass of the satellite to a centre of the earth.

Specifically, the network side device defines the satellite's beam offset coverage area, designs a beam offset strategy according to parameters such as satellite beam width, orbit height, and offset capability, and controls the beam offset adjustment after the LEO satellite enters the offset region. The network side device notifies the terminal of the beam offset parameter and beam offset strategy of the satellite via a downlink broadcast information or a dedicated signalling such as radio resource control (RRC).

The network side device can also notify the terminal of the beam offset angle $\alpha$ of the satellite beam via a broadcast message, and the angle is defined as the angle between a central axis of a beam of the satellite and a line connecting the satellite to a centre of the earth.

The network side device notifies the terminal of the beam offset indication parameter in the broadcast message, the beam offset indication parameter is used to notify the terminal that the current beam is offset.

The network side device uses the RRC signalling to notify the terminal of the satellite beam offset angle information.

After the terminal obtains the beam offset angle information of the satellite, the terminal uses it in the calculation of related information.

Network side behaviour can be specifically implemented by a signal gateway station or a satellite base station, which can be:
the signal gateway station or satellite base station determines the beam offset angle of the satellite according to the beam offset strategy set by the system;
the signal gateway station or satellite base station notifies the terminal of the beam offset angle of the satellite via a broadcast message or a dedicated signalling.

Terminal side behaviour can be:
the terminal obtains satellite beam offset information via information carried by downlink broadcast message or downlink RRC signalling, and uses the offset data to calculate related information.

Further description will be given below in conjunction with examples.

1. Definition of Beam Offset Angle.

The satellite beam offset parameter includes a beam offset angle α of a satellite, the beam offset angle α being an angle between a central axis of a beam of the satellite and a line connecting a centre of mass of the satellite to a centre of the earth.

Specifically, it is assumed that only the one-dimensional offset of the beam is considered in the solution, that is, the satellite beam is offset in only one direction. The direction of this offset can be a direction consistent with the direction of the satellite movement, or a direction perpendicular to the direction of the satellite movement.

Take the offset direction being the direction consistent with the direction of the satellite movement direction as an example.

The beam offset angle α of the satellite is defined as the angle between a central axis of a beam of the satellite and a line connecting a centre of mass of the satellite to a centre of the earth. At this time, the angle between the satellite movement direction and the central axis of the beam of the satellite is 90°-α. In normal mode, the satellite beam is directed vertically to the ground, and the a angle is 0°.

2. Implementation of Notifying the Terminal of the Satellite Beam Offset Parameter.

When the network side device indicates the satellite beam offset parameter to the terminal via a broadcast message and/or a dedicated signalling, there are at least the following two manners for notifying the terminal of the satellite beam offset parameter.

Manner 1:

using the broadcast message system information block (SIB) for indication.

The network side device may indicate to following terminals via the broadcast message: a terminal during initial access, a terminal in an idle state, or a terminal during cell reselection.

The terminal may receive the satellite beam offset parameter indicated by the network side device via the broadcast message in one of following ways or a combination of the following ways:

receiving the indicated parameter via the broadcast message during initial access;

receiving the indicated parameter via the broadcast message in an idle state;

receiving the indicated parameter via the broadcast message in the idle state;

receiving the indicated parameter via the broadcast message during cell reselection.

This manner indicates the satellite beam offset parameters of current and neighbouring cells to the terminal in the initial access phase, in the idle state or during cell reselection, etc.

Manner 2:

using the dedicated signalling, including RRC information, downlink control indicator (DCI) indication information or MAC CE (media access control control element) indication information.

The network side device may indicate to following terminals via the dedicated signalling: a terminal to be handed over to a target cell, or a terminal to be handed over to a target satellite.

The terminal may receive the satellite beam offset parameter indicated by the network side device via the dedicated signalling in one of following ways or a combination of the following ways:

receiving the indicated parameter via the dedicated signalling while waiting for a handover to a target cell;

receiving the indicated parameter via the dedicated signalling while waiting for a handover to a target satellite.

This manner can be used when the terminal is already connected to the network, especially when during the beam handover, and the network needs to indicate the beam offset parameter of the target cell or target satellite to be handed over to and help the terminal to quickly point to the new cell. During radio resource management (RRM) measurement of a neighbouring cell, learning the beam offset information of the neighbouring cell can speed up the terminal's direction tracking process.

3. Implementation of the Signalling Indication Format of the Satellite Beam Offset Angle.

In order to effectively indicate the satellite beam offset angle, the angle range needs to include [0, 180°], and a maximum of 8-bit indication information is required.

The network side device may indicate the beam offset angle α to the terminal with information less than or equal to 8 bits in a broadcast message and/or a dedicated signalling.

The indicated parameter received by the terminal includes information of the beam offset angle α which is less than or equal to 8 bits.

4. The Implementation of the Terminal Using Satellite Beam Offset Information.

For the terminal's adjustment of its communication process according to the satellite beam offset parameter, the following takes the terminal inter-satellite handover as an example to introduce how the terminal uses the satellite beam offset information.

In the beam offset mode, the satellite ground coverage is deformed, so that the terminal located directly under the satellite beam may not be able to access the satellite; in the normal coverage mode, the terminal in the handover area may not need to start handover. Therefore, the satellite beam offset has significant impact on ground coverage, terminal handover, etc.

According to the beam offset, the network side device transmits the beam offset angle in the form of a broadcast message.

After the terminal is connected to the network, the terminal obtains the beam offset data from the broadcast message, and uses the satellite beam offset indication parameter, the satellite ephemeris information, and the terminal geographic location to jointly calculate the terminal pointing parameter in the cell. When the terminal needs to be handed over, it calculates the handover parameters of the target satellite according to the beam offset data, and then implements the handover.

Based on the same inventive concept, embodiments of the present disclosure also provide a network side device, a terminal, a satellite beam offset processing apparatus, and a computer-readable storage medium. Since the problem-solving principle of these devices is similar to that of the satellite beam offset processing methods, the implementation of these devices can be referred to the implementation of the methods and will not be repeated.

When implementing the technical solution provided by the embodiments of the present disclosure, it can be implemented as follows.

Figure 5:
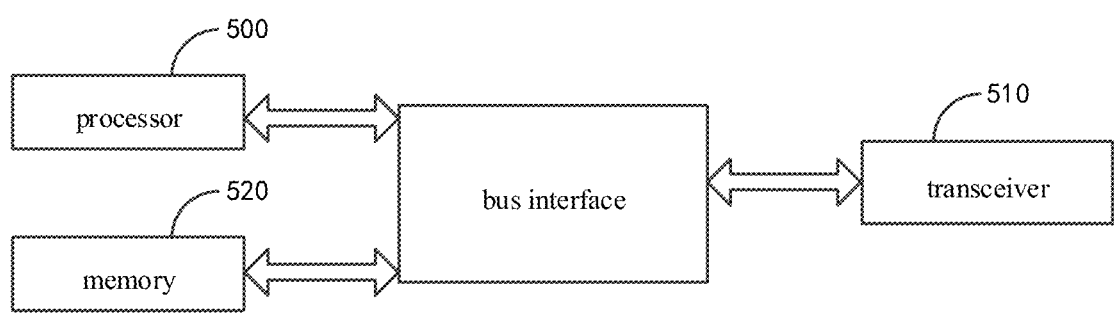
FIG. 5 is a schematic structural diagram of a base station according to an embodiment of the present disclosure.

FIG. 5 is a schematic structural diagram of a base station. As shown in the figure, the base station includes:

a processor 500, configured to read a program in a memory 520 to perform the following process:

determining a satellite beam offset parameter;

indicating the satellite beam offset parameter to a terminal via a broadcast message and/or a dedicated signalling;

a transceiver 510, configured to receive and transmit data under control of the processor 500.

In an implementation, the broadcast message is an SIB; and/or, the dedicated signalling includes one of the following information or a combination of the following information: RRC information, DCI indication information or MAC CE indication information.

In an implementation, the indicating the satellite beam offset parameter to the terminal via the broadcast message and/or the dedicated signalling includes:

the network side device indicating to following terminals via the broadcast message: a terminal during initial access, a terminal in an idle state, or a terminal during cell reselection; and/or, the network side device indicating to following terminals via the dedicated signalling: a terminal to be handed over to a target cell, or a terminal to be handed over to a target satellite.

In an implementation, the satellite beam offset parameter includes a beam offset angle α of a satellite, the beam offset angle α being an angle between a central axis of a beam of the satellite and a line connecting a centre of mass of the satellite to a centre of the earth.

In an implementation, the network side device indicates the beam offset angle α to the terminal with information less than or equal to 8 bits in the broadcast message and/or the dedicated signalling.

In FIG. 5, the bus architecture may include any number of interconnected buses and bridges, various circuits such as one or more processors specifically represented by the processor 500 and memory represented by the memory 520 are connected together. The bus architecture may also connect various other circuits, such as peripheral devices, voltage regulators, and power management circuits, etc., which are well known in the field and, therefore, will not be further described herein. The bus interface provides the interface. The transceiver 510 may be a plurality of elements, that is, including a transmitter and a receiver, and provides a unit for communicating with various other devices on the transmission medium. The processor 500 is responsible for managing the bus architecture and general processing, and the memory 520 may store data used by the processor 500 when performing operations.

An embodiment of the present disclosure provides a satellite beam offset processing apparatus, including:

a determination module, configured to determine a satellite beam offset parameter;

an indication module, configured to indicate the satellite beam offset parameter to a terminal via a broadcast message and/or a dedicated signalling.

Specific implementations can be referred to the implementation of the satellite beam offset processing method on the network side.

For the convenience of description, parts of the device described above are divided into various modules or units by function and are described respectively. Of course, when implementing the present disclosure, the functions of the modules or units may be implemented in one or more pieces of software or hardware.

Figure 6:
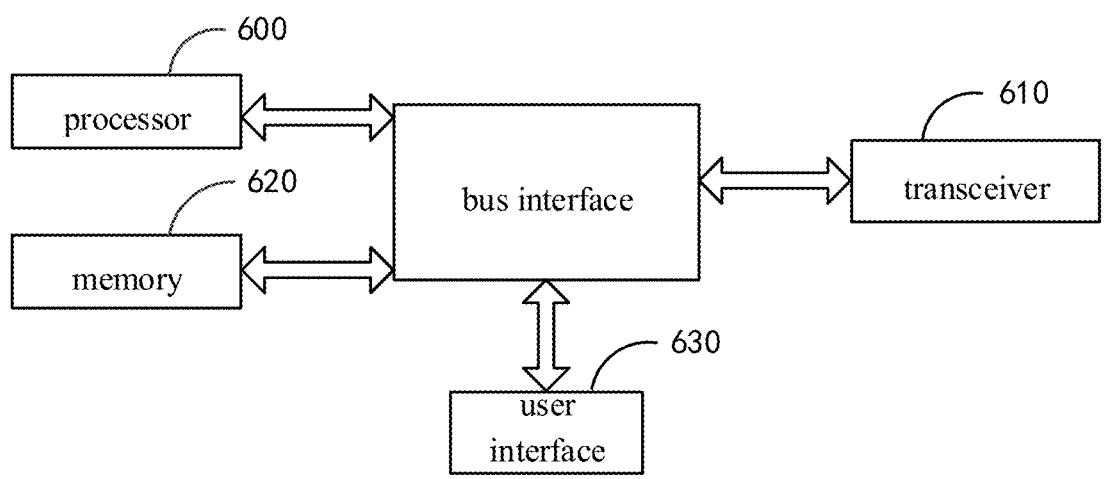
FIG. 6 is a schematic structural diagram of a terminal according to an embodiment of the present disclosure.

FIG. 6 is a schematic structural diagram of a terminal. As shown in the figure, the terminal includes:

a processor 600, configured to read a program in a memory 620 to perform the following process:

receiving a satellite beam offset parameter indicated by the network side device via a broadcast message and/or a dedicated signalling;

adjusting the communication process of the terminal according to the satellite beam offset parameter;

a transceiver 610, configured to receive and transmit data under control of the processor 600.

In an implementation, the broadcast message is an SIB; and/or, the dedicated signalling includes one of the following information or a combination of the following information: RRC information, DCI indication information or MAC CE indication information.

In an implementation, the terminal receives the satellite beam offset parameter indicated by the network side device via the broadcast message and/or the dedicated signalling in one of following ways or a combination of the following ways:

receiving the indicated parameter via the broadcast message during initial access;

receiving the indicated parameter via the broadcast message in an idle state;

receiving the indicated parameter via the broadcast message in the idle state;

receiving the indicated parameter via the broadcast message during cell reselection;

receiving the indicated parameter via the dedicated signalling while waiting for a handover to a target cell;

receiving the indicated parameter via the dedicated signalling while waiting for a handover to a target satellite.

In an implementation, the satellite beam offset parameter includes a beam offset angle α of a satellite, the beam offset angle α being an angle between a central axis of a beam of the satellite and a line connecting a centre of mass of the satellite to a centre of the earth.

In an implementation, the indicated parameter received by the terminal includes information of the beam offset angle α which is less than or equal to 8 bits.

In FIG. 6, the bus architecture may include any number of interconnected buses and bridges, various circuits such as one or more processors specifically represented by the processor 600 and memory represented by the memory 620 are connected together. The bus architecture may also connect various other circuits, such as peripheral devices, voltage regulators, and power management circuits, etc., which are well known in the field, and, therefore, will not be further described herein. The bus interface provides the interface. The transceiver 610 may be a plurality of elements, that is, including a transmitter and a receiver, and provides a unit for communicating with various other devices on the transmission medium. For different user equipment, the user interface 630 may also be an interface capable of connecting externally or internally the required device, and the connected device includes, but is not limited to, a keypad, a display, a speaker, a microphone, a joystick, etc.

The processor 600 is responsible for managing the bus architecture and general processing, and the memory 620 may store data used by the processor 600 when performing operations.

An embodiment of the present disclosure provides a satellite beam offset processing apparatus, including:

a receiving module, configured to receive a satellite beam offset parameter indicated by the network side device via a broadcast message and/or a dedicated signalling;

a communication module, configured to adjust a communication process of a terminal according to the satellite beam offset parameter.

Specific implementations can be referred to the implementation of the satellite beam offset processing method on the terminal side.

For the convenience of description, parts of the device described above are divided into various modules or units by function and are described respectively. Of course, when implementing the present disclosure, the functions of the modules or units may be implemented in one or more pieces of software or hardware.

An embodiment of the present disclosure provides a computer-readable storage medium, where the computer-readable storage medium stores a computer program for the above-mentioned satellite beam offset processing method.

Specific implementations can be referred to the implementations of the satellite beam offset processing method on the network side and/or the satellite beam offset processing method on the terminal side.

In the technical solutions provided in the embodiments of the present disclosure, the network adds the satellite beam offset information in the broadcast message or in the RRC signalling, to notify the terminal.

After receiving the beam offset information indicated by the network side device, the information is used as the input for the terminal to calculate the related information.

The technical solutions provided in the embodiments of the present disclosure propose an offset information indication solution to the satellite beam offset problem of the satellite communication system, the solution indicating the offset data of the satellite beam via the network broadcasting message or the dedicated signalling to the terminal as an important input for calculating related information, which is helpful for the normal operation of the system in the case that beam is offset.

It is appreciated by a person skilled in the art that, embodiments of the present disclosure may be implemented as a method, system or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer usable storage media (including, but not limited to, a magnetic disk storage, optical storage or the like) storing therein computer usable program codes.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which are executed via the processor of the computer or other programmable data processing terminal device, create means for implementing the functions specified in the flow diagram flow or flows and/or block diagram block or blocks.

These computer program instructions may also be stored in a computer-readable storage that can direct a computer or other programmable data processing terminal device to function in a particular manner, such that the instructions stored in the computer-readable storage produce an article of manufacture including instruction means which implement the function specified in the flow diagram flow or flows and/or block diagram block or blocks.

The computer program instructions may also be loaded onto a computer or other programmable data processing terminal device to cause a series of operational steps to be performed on the computer or other programmable terminal device, to produce a computer-implemented process, such that the instructions which are executed on the computer or other programmable terminal device provide steps for implementing the functions specified in the flow diagram flow or flows and/or block diagram block or blocks.

It should be noted that the above division of each module is only a logical functional division, and the actual implementation can be fully or partially integrated into a physical entity, or can be physically separated. And these modules can all be implemented in the form of software called by processing elements; they can also all be implemented in the form of hardware; they can also be partially implemented in the form of software called by processing elements and partially implemented in the form of hardware. For example, the determination module can be a separately provided processing element or can be integrated in one of the chips of the above-mentioned device for implementation, in addition, it can also be stored in the memory of the above-mentioned device in the form of program code, which is called by a processing element of the above-mentioned device and performs the functions of the above-mentioned determination module. Other modules are implemented in a similar way. Furthermore, all or some of these modules can be integrated together or can be implemented independently. The processing element described here may be an integrated circuit with signal processing capabilities. In the implementation, the individual steps of the above-mentioned method or the above-mentioned individual modules may be accomplished by integrated logic circuits in hardware in the processor element or by instructions in the form of software.

For example, the individual modules, units, subunits, or submodules may be one or more integrated circuits configured to implement the above methods, e.g., one or more application specific integrated circuits (ASIC), or, one or more digital signal processors (DSP), or, one or more field programmable gate arrays (FPGA), etc. Further, when one of the above modules is implemented in the form of a processing element that schedules program code, the processing element may be a general purpose processor, such as a central processing unit (CPU) or other processor that can call program code. Further, these modules may be integrated together and implemented as a system-on-a-chip (SOC).

The terms "first" and "second", etc. in the specification and claims of this disclosure are used to distinguish similar objects, without describing any particular order or sequence existing among these objects. It should be understood that the data so used may be interchanged, where appropriate, so that the embodiments of the present disclosure described herein are implemented in an order other than those illustrated or described herein. Moreover, the terms "include", "have" and any variations thereof in the present disclosure are intended to cover a non-exclusive inclusion, such that a process, a method, a product, or a device that includes a series of steps or units not only includes the series of steps or units, but also may include other steps or units not expressly listed or include steps or units inherent to the process, the method, the product, or the device. In addition, "and/or" in the specification and claims is used to indicate at least one of the connected objects, for example, A and/or B and/or C indicates the seven cases comprising A alone, B alone, C alone, and A and B both present, B and C both present, A and C both present, and A, B, and C all present. Similarly, the use of "at least one of A and B" in this specification and in the claims should be understood to mean "A alone, B alone, or A and B both present".

Obviously, for a person skilled in the art, several improvements and modifications can be made without departing from the principles of the present disclosure. The present disclosure intends to encompass these improvements and modifications if they fall within the scope of the claims and its equivalents.

What is claimed is:

1. A satellite beam offset processing method, comprising:
    a network side device determining a satellite beam offset parameter;
    the network side device indicating the satellite beam offset parameter to a terminal via a broadcast message and/or a dedicated signalling;
    wherein the satellite beam offset parameter comprises a beam offset angle α of a satellite, the beam offset angle α being an angle between a central axis of a beam of the satellite and a line connecting a centre of mass of the satellite to a centre of the earth.

2. The satellite beam offset processing method according to claim 1, wherein the broadcast message is a system information block (SIB); and/or the dedicated signalling comprises one of following information or a combination of the following information: radio resource control (RRC) information, downlink control indicator (DCI) indication information or medium access control control element (MAC CE) indication information.

3. The satellite beam offset processing method according to claim 1, wherein the network side device indicating the satellite beam offset parameter to the terminal via the broadcast message and/or the dedicated signalling comprises:
    the network side device indicating the satellite beam offset parameter to following terminals via the broadcast message: a terminal during initial access, a terminal in an idle state, or a terminal during cell reselection; and/or,
    the network side device indicating the satellite beam offset parameter to following terminals via the dedicated signalling: a terminal to be handed over to a target cell, or a terminal to be handed over to a target satellite.

4. The satellite beam offset processing method according to claim 1, wherein the network side device indicates the beam offset angle α to the terminal with information less than or equal to 8 bits in the broadcast message and/or the dedicated signalling.

5. A satellite beam offset processing method, comprising:
    a terminal receiving a satellite beam offset parameter indicated by a network side device via a broadcast message and/or a dedicated signalling;
    the terminal adjusting a communication process of the terminal according to the satellite beam offset parameter;
    wherein the satellite beam offset parameter comprises a beam offset angle α of a satellite, the beam offset angle α being an angle between a central axis of a beam of the satellite and a line connecting a centre of mass of the satellite to a centre of the earth.

6. The satellite beam offset processing method according to claim 5, wherein the broadcast message is an SIB; and/or the dedicated signalling comprises one of following information or a combination of the following information: RRC information, DCI indication information or MAC CE indication information.

7. The satellite beam offset processing method according to claim 5, wherein the terminal receives the satellite beam offset parameter indicated by the network side device via the broadcast message and/or the dedicated signalling in one of following ways or a combination of the following ways:
    receiving the indicated parameter via the broadcast message during initial access;
    receiving the indicated parameter via the broadcast message in an idle state;
    receiving the indicated parameter via the broadcast message during cell reselection;
    receiving the indicated parameter via the dedicated signalling while waiting for a handover to a target cell;
    receiving the indicated parameter via the dedicated signalling while waiting for a handover to a target satellite.

8. The satellite beam offset processing method according to claim 5, wherein the indicated parameter received by the terminal comprises information of the beam offset angle α, the information being less than or equal to 8 bits.

9. A network side device, comprising:
    a processor, configured to read a program in a memory to perform following process:
    determining a satellite beam offset parameter;
    indicating the satellite beam offset parameter to a terminal via a broadcast message and/or a dedicated signalling;
    a transceiver, configured to receive and transmit data under control of the processor;
    wherein the satellite beam offset parameter comprises a beam offset angle α of a satellite, the beam offset angle α being an angle between a central axis of a beam of the satellite and a line connecting a centre of mass of the satellite to a centre of the earth.

10. The network side device according to claim 9, wherein the broadcast message is an SIB; and/or the dedicated signalling comprises one of following information or a combination of the following information: RRC information, DCI indication information or MAC CE indication information.

11. The network side device according to claim 9, wherein, the indicating the satellite beam offset parameter to the terminal via the broadcast message and/or the dedicated signalling comprises:
    indicating the satellite beam offset parameter to following terminals via the broadcast message: a terminal during initial access, a terminal in an idle state, or a terminal during cell reselection; and/or,
    indicating the satellite beam offset parameter to following terminals via the dedicated signalling: a terminal to be handed over to a target cell, or a terminal to be handed over to a target satellite.

12. The network side device according to claim 9, wherein the network side device indicates the beam offset angle α to the terminal with information less than or equal to 8 bits in the broadcast message and/or the dedicated signalling.

13. A terminal, comprising:
    a processor, configured to read a program in a memory to perform the method according to claim 5.

14. The terminal according to claim 13, wherein the broadcast message is an SIB; and/or the dedicated signalling comprises one of following information or a combination of the following information: RRC information, DCI indication information or MAC CE indication information.

15. The terminal according to claim 13, wherein the terminal receives the satellite beam offset parameter indicated by the network side device via the broadcast message and/or the dedicated signalling in one of following ways or a combination of the following ways:
   receiving the indicated parameter via the broadcast message during initial access;
   receiving the indicated parameter via the broadcast message in an idle state;
   receiving the indicated parameter via the broadcast message during cell reselection;
   receiving the indicated parameter via the dedicated signalling while waiting for a handover to a target cell;
   receiving the indicated parameter via the dedicated signalling while waiting for a handover to a target satellite.

16. The terminal according to claim 13, wherein the indicated parameter received by the terminal comprises information of the beam offset angle $\alpha$, the information being less than or equal to 8 bits.

* * * * *